(12) United States Patent
Guru et al.

(10) Patent No.: US 12,334,849 B2
(45) Date of Patent: Jun. 17, 2025

(54) METHOD AND APPARATUS FOR COMMUNICATION BETWEEN ANALYTIC MODULES AND A MOTOR DRIVE

(71) Applicant: Rockwell Automation Technologies, Inc., Mayfield Heights, OH (US)

(72) Inventors: Arun K. Guru, Brookfield, WI (US); Shankernarayan Ramanarayanan, Eden Prairie, MN (US); Kevin J. Riederer, Glendale, WI (US); James C. Sandell, Prior Lake, MN (US); Jon P. Vanderpas, Appleton, WI (US); Chetan Chandrasekara, Chanhassen, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 402 days.

(21) Appl. No.: 17/709,330

(22) Filed: Mar. 30, 2022

(65) Prior Publication Data
US 2023/0318498 A1    Oct. 5, 2023

(51) Int. Cl.
*H02P 23/00* (2016.01)
*H02P 21/10* (2016.01)
*H02P 21/16* (2016.01)

(52) U.S. Cl.
CPC .............. *H02P 23/00* (2013.01); *H02P 21/10* (2013.01); *H02P 21/16* (2016.02)

(58) Field of Classification Search
CPC ...... G05B 19/4185; G05B 2219/31145; G05B 19/042; G05B 2219/1214;
(Continued)

(56) References Cited

U.S. PATENT DOCUMENTS 6,640,308 B1 * 10/2003 Keyghobad .......... G05B 19/042
370/257
9,673,685 B2    6/2017 Cooper et al.
(Continued)

FOREIGN PATENT DOCUMENTS

EP          415611 A1 *  3/2023
KR  20180031158 A   *  3/2018

OTHER PUBLICATIONS

Seung , Design and Implementation of an Ethernet-Based Linear Motor Drive for Industrial Transport Systems, 2021, IEEE, 33061-33074 (Year: 2021).*
(Continued)

*Primary Examiner* — Bickey Dhakal
(74) *Attorney, Agent, or Firm* — Boyle Fredrickson, S.C.

(57) ABSTRACT

A method and system for communication between a motor controller and an analytic module includes a Single Pair Ethernet interface with power supplied over the two data lines. The analytic module, in turn, connects to a motor or other devices proximate the motor. The analytic module receives input signals from the motor or different types of sensors or devices. A processing unit in the analytic module may perform some initial processing on the incoming data. The processing unit is configured to transmit either the raw input signals or processed data via the Single Pair Ethernet connection back to the motor controller or to other controllers in the system with the motor controller acting solely as a pass-through gateway. The analytic module unit may be configured to transmit data at different update rates. One of the update rates may be synchronized to an update period in the motor controller.

18 Claims, 4 Drawing Sheets

(58) Field of Classification Search
CPC ......... G05B 2219/33221; G05B 2219/333219; H04L 67/125
See application file for complete search history.

(56) References Cited

U.S. PATENT DOCUMENTS

| | | | |
|---|---|---|---|
| 10,879,831 B1 | 12/2020 | Nagel et al. | |
| 2008/0294915 A1* | 11/2008 | Juillerat | H04L 12/40045 713/300 |
| 2011/0269339 A1* | 11/2011 | Baran | H05K 7/1474 439/532 |
| 2012/0256566 A1* | 10/2012 | Chaffee | G06F 13/124 700/275 |
| 2014/0207287 A1* | 7/2014 | Hirayama | G05B 19/042 700/275 |
| 2015/0362896 A1* | 12/2015 | Feldstein | G05B 15/02 700/275 |
| 2018/0351483 A1* | 12/2018 | Arisawa | H02M 7/53873 |
| 2019/0104205 A1* | 4/2019 | Xu | H04L 69/18 |
| 2020/0007359 A1 | 1/2020 | Blount et al. | |
| 2020/0125049 A1* | 4/2020 | Kobayashi | G01D 5/2454 |
| 2022/0050451 A1 | 2/2022 | Stay et al. | |

OTHER PUBLICATIONS

Siemens AG; "Smart Conditioning Monitoring for Your Machinery"; Siemens SITRANS SCM IQ Brochure 2021; siemens.com/scmiq—(5) pages.

Beckhoff New Automation Technolgy; "EtherCAT P—ultra-fast communication and power in one cable"; Beckhoff EtherCat Brochure Nov. 2019; www.beckhoff.com/EtherCATP—(28) pages.

Extended European Search Report for Related Application No. 23158527.4 dated Jul. 26, 2023 (9 pages).

* cited by examiner

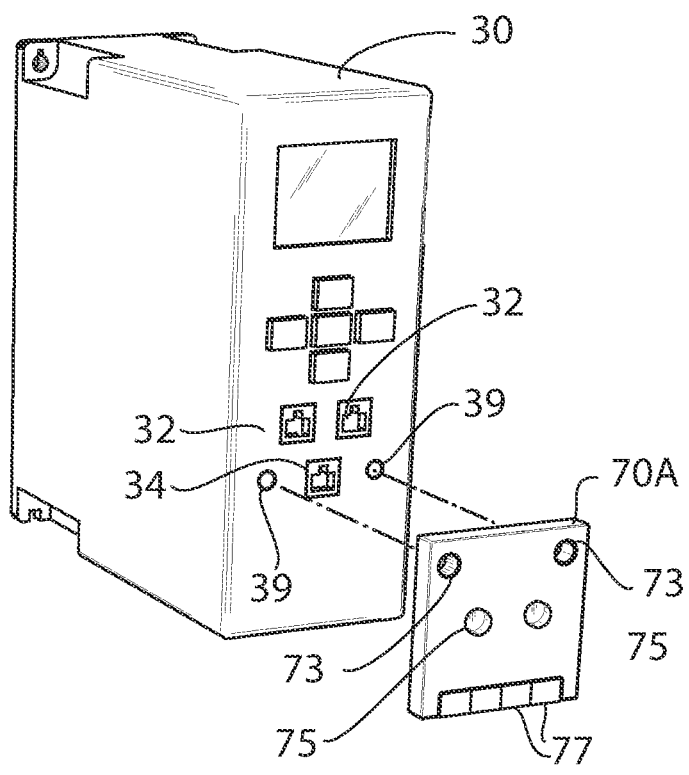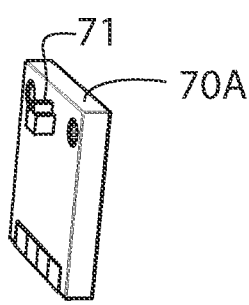
FIG. 3A  FIG. 3B
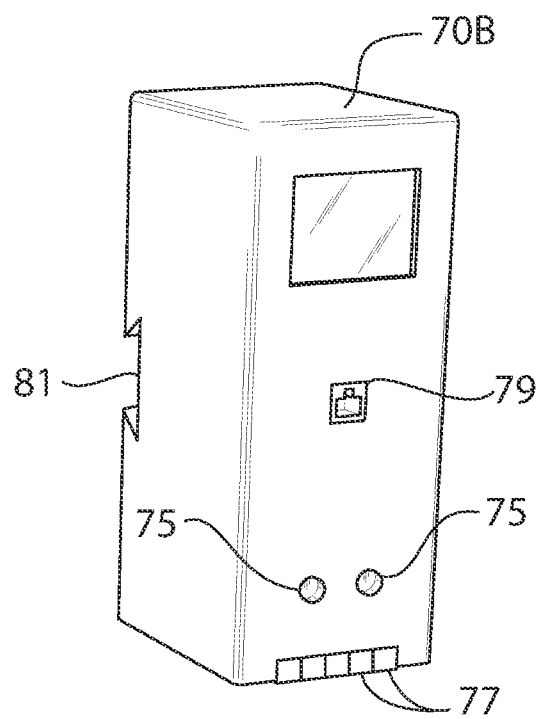
FIG. 4

METHOD AND APPARATUS FOR COMMUNICATION BETWEEN ANALYTIC MODULES AND A MOTOR DRIVE

BACKGROUND INFORMATION

The subject matter disclosed herein relates generally to a method and system for communication between analytic modules and a motor drive in a motion application and, more specifically, to a method and system for communication between a motor drive and the analytic modules via a single-pair Ethernet connection, where the analytic module is, in turn, in communication with the motor, load mounted devices, position feedback devices, or other sensors proximate the motor.

Electric motors are commonly utilized for controlling motion in industrial applications. Motors may be used to drive conveyor belts, winding equipment, robots, pick and place machinery, and the like. Electric motors are commonly paired with a motor drive, also referred to herein as a motor controller, and a position feedback device where the motor controller may include algorithms paired with the motor, and the position feedback device facilitates angular positioning of the motor.

Commonly, electric motors and motor controllers are incorporated into a larger controlled machine, system, or process. The controlled machine, system, or process may include a central controller, one or more distributed industrial controllers, and often multiple motors and motor controllers. The central controller may be a desktop computer located in a control room or in a remote facility. Optionally, the central controller may be an industrial computer, configured to operate in a harsh environment and located at the controlled machine, system, or process. The industrial controllers include processors and operating systems optimized for real-time control and are programmed with languages designed to permit rapid development of control programs tailored to a constantly varying set of machine control or process control applications.

An industrial control network is typically employed to facilitate communications between devices in the controlled machine, system, or process. The industrial networks are typically selected to exhibit high reliability and real-time communication. The industrial network may utilize protocols such as EtherCAT®, Ethernet/IP®, or Profinet® which have been developed for automation applications and include features such as a guaranteed maximum communication delay, low communication jitter, pre-scheduling of the communication capacity of the network, and/or providing seamless redundant communication capabilities for high-availability.

Historically, it has been known to install the network between controllers, such as the central controller and the industrial controller. Further, certain devices such as motor drives may be configurable, include a large parameter set, have sufficient processing capabilities, or the like such that they may include a network interface and are also connected to the industrial network. Other devices, however, such as motors, sensors, relays, and other actuators, provide input signals to or receive output signals from one of the controllers and perform fixed tasks in the controlled machine, system, or process. These devices are typically located remotely, and often at long runs, from the control cabinets in which the controllers are located. Wiring must be run between the control cabinets and each of the devices. Because of the expense of running network cabling to and providing network interfaces on every device, many of these devices are not connected directly to the network. The input and/or output signals are transmitted directly between one of the controllers and the device. Optionally, groups of signals may be routed to an intermediate location and pass through a gateway which is connected to the industrial network and which can convert the input and output signals from separate signals to data in a message packet to be transmitted via the desired industrial protocol for at least a portion of the distance between the controllers and the devices.

Traditionally, a motor controller has served as a gateway in the industrial network. The motor controller includes a network interface and is configured to communicate via the industrial network. The motor controller also communicates on a point-to-point basis to transmit and receive output and input signals with devices connected to the motor controller. The devices include, for example, a brake on the motor, a temperature sensor, a vibration sensor, or a position encoder mounted on the motor.

However, recent trends have been to include additional sensors on the motor or other load mounted devices to monitor operating conditions in the motor. The additional sensors may include, for example, vibration sensors mounted to the motor as disclosed in U.S. Pat. No. 9,673,685 to measure the vibration present on the motor. Temperature sensors may be mounted at different locations on the motor, encoder, gearbox, or the like to provide information on ambient conditions or to provide early detection of an impending failure in the motor. Torque transducers or accelerometers may be provided to measure performance of the motor.

The addition of these devices communicating with the motor controller requires additional wiring between each of the devices and the motor controller. The motor controller must also be configured to communicate with each device. Different communications protocols may be utilized by different devices, requiring the motor controller to accept each of the communication protocols. Certain communications are unidirectional, providing, for example, data from a sensor to the motor controller, but preventing, for example, configuration of the sensor by the motor controller. For devices that allow bidirectional communication, the communication is restricted to communication between the device and the motor controller and does not provide for extended communication between the device and other controllers over the industrial network. Further, the additional signals utilize processing bandwidth of the motor controller to sample each signal and to perform subsequent processing on the signal, such as storing the signal, converting the signal from an analog value to a digital value, packing the value of the signal into a data packet for transmission to the industrial controller, or the like as required by the application. Increasing complexity and more demanding performance requirements for control routines to control operation of the motor place competing demands on the resources of the motor controller.

Thus, it would be desirable to provide an improved method and system for communication between a motor controller and a motor or between the motor controller and devices mounted on or proximate to the motor.

BRIEF DESCRIPTION

According to one embodiment of the invention, a system for communication between a motor drive and at least one electronic device is disclosed, where the motor drive is operative to control a motor in an industrial control system. The system includes a first Ethernet communication interface in the motor drive and a second Ethernet communication interface in an analytic module. The first Ethernet communication interface is configured to receive a first end of a single-pair Ethernet cable, and the second Ethernet communication interface is configured to receive a second end of the single-pair Ethernet cable. Power is provided to the analytic module from the motor drive via the single-pair Ethernet cable. The analytic module also includes at least one input configured to receive a feedback signal from the at least one electronic device and a processor. The feedback signal corresponds to an operating state in the industrial control system. The processor is configured to receive the feedback signal from the at least one input, insert a value of the feedback signal in a data packet, and transmit the data packet to the motor drive via the single-pair Ethernet cable in real-time.

According to another embodiment of the invention, a method for communication between a motor drive and at least one electronic device is disclosed, where the motor drive is operative to control a motor in an industrial control system. A feedback signal is received from the at least one electronic device at an input to an analytic module. The analytic module is connected to the motor drive via a single-pair Ethernet cable, and the analytic module is configured to receive power from the motor drive via the single-pair Ethernet cable. The feedback signal corresponds to an operating state in the industrial control system. A value of the feedback signal is inserted in a data packet with a processor for the analytic module, and the data packet is transmitted to the motor drive via the single-pair Ethernet cable in real-time.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 3A is a partial exploded view illustrating a first embodiment of the invention configured to mount to a motor drive;

FIG. 3B is a perspective view of the first embodiment of the invention;

FIG. 4 is a perspective view of a second embodiment of the invention;

Figure 1:
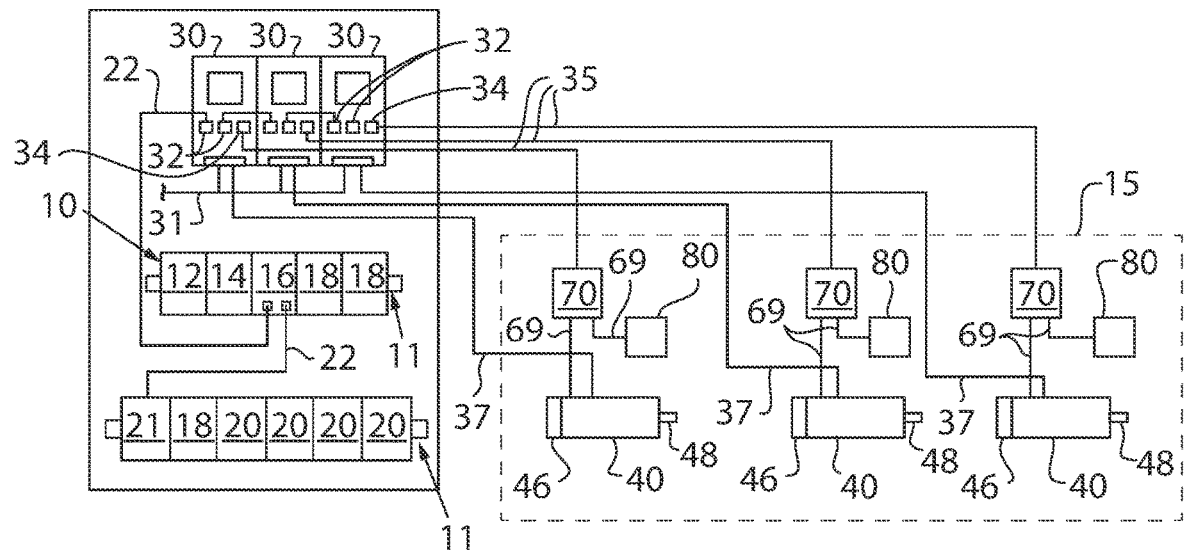
FIG. 1 is a is a schematic representation of an exemplary motion application illustrating one embodiment of communicating with a motor.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein provides an improved method and system for communication between a motor controller and a motor or between the motor controller and devices mounted on or proximate to the motor. An analytic module is provided for communication with the motor controller. To simplify wiring, a two-wire, Single Pair Ethernet interface with power supplied over the two data lines may be utilized between the analytic module and the motor controller. The Ethernet connection with power is referred to as Power over Ethernet (PoE). The power supplied to the analytic module via the PoE connection is used to energize the analytic module. Thus, the Single Pair Ethernet connection is sufficient wiring to both energize the analytic module and provide for communication between the module and the motor controller.

According to different embodiments of the invention, the analytic module may be configured to mount in different positions. According to a first embodiment of the invention, the analytic module is configured to mount directly to the motor drive. The analytic module includes an Ethernet plug that directly engages the socket on the motor drive and further includes at least one mechanical coupling, such as a screw, bolt, or other fastener that secures the analytic module to the motor drive. According to another embodiment of the invention, the analytic module may be configured to mount independently of other devices. The analytic module is enclosed within its own housing, where the housing includes mounting features, such as a slot configured to engage a rail, such as rail specified by the Deutsches Institut fur Normung (DIN), or holes through which bolts may pass to mount to a control panel or another surface on the controlled machine or process. According to still another embodiment of the invention, the analytic module is configured to mount to the motor controlled by the motor drive. The analytic module may be configured to mount to an end surface of the machine, a side or top surface of the machine, or within an existing housing on the machine. Each of the embodiments includes a connector on the analytic module configured to receive one end of the PoE cable, where the other end of the PoE cable is connected to the motor drive.

The analytic module is configured to receive input signals or input data from multiple different types of sensors or devices mounted on or around the controlled machine or process. According to one embodiment of the invention, the analytic module includes a primary encoder interface configured to receive data from a first encoder operatively mounted on the motor which provides information on the angular position of the motor. The analytic module may also include a secondary encoder interface configured to receive data from a second encoder. The second encoder may be mounted, for example, at a location along the output of the motor, a gearbox connected to the motor, or on the load and is used to verify operation of the motor and/or a mechanical coupling between the motor. Similarly, the second encoder may be coupled to and verify operation of an element of the controlled machine or process that is driven by the motor. The analytic module further includes at least one additional input. Each additional input may be a digital signal, an analog signal, or a serial input corresponding, for example, to a temperature, vibration, load torque, or other operating parameter being monitored by a sensor on the motor, gearbox, or located in proximity to the motor. The analytic module includes a sensor interface circuit configured to receive the input from each encoder and each additional sensor and transfer the input signals to a processing unit located within the analytic module.

The processing unit is configured to transmit the input signals back to the motor controller. Because the analytic module is connected to the motor controller via a two-wire, Single Pair Ethernet interface, the processing unit may assemble data received from the input signals into data packets for transmission. In addition, the analytic module may assemble the data packets according to the protocol present on the industrial network connected between the motor controller and an industrial controller or central controller present in the controlled system and transmit data directly to the industrial controller or central controller with the motor controller acting solely as a pass-through gateway allowing data packets to continue on along the industrial network without substantial processing within the motor controller. When data is transmitted directly from the analytic module to the industrial controller or central controller, a network interface located in the motor controller may handle all of the processing of the data packet without routing the data packet to the processor of the motor controller, thereby eliminating the processing burden for gateway functions from the processor of the motor controller.

The processing unit in the analytic module may also be configured to perform some initial functions on the incoming data. The analytic module includes memory and may store a number of data samples. The processing unit may, for example, assemble multiple samples for a single transmission to the motor controller or back to the industrial controller. The processing unit may be configured to perform some initial analysis of the data, for example, converting the raw encoder data to an angular position or angular velocity prior to transmitting the data. The processing unit may be configured to store a baseline value of a data signal or to store data over an extended period of time and monitor the input data for changes over time. By detecting a change over time, the processing unit may generate a signal indicating a failure of a device or generate a signal indicating preventive maintenance is required.

The processing unit may be configured to transmit data at different update rates. Raw data from the encoder, for example, may be utilized by the motor controller for real time control. This data from the encoder, or encoders, may be transmitted at a fast update rate. Other data, such as an input signal from a temperature sensor may not change rapidly. The processing unit may be configured to transmit this data at a slower update rate, where the slower update rate may be configurable and range from milliseconds to seconds or longer according to the application requirements. It is also contemplated that the processing unit may be configured to communicate with the motor controller to synchronize execution of one or more of the periodic updates in the analytic module with a periodic routine executing in the motor controller.

Turning initially to FIG. 1, an exemplary industrial controller 10 is provided to control operation of an industrial machine or process. The illustrated industrial controller 10 includes a power supply module 12, a processor module 14, a communication module 16, multiple input modules 18, and multiple output modules 20. A remote rack is connected to the industrial controller via an adapter module 21. The adapter module 21 is connected to the communication module 16 via a network cable 22 and to still additional input and output modules 18, 20 via a second backplane extending between the adapter module 21 and each of the input and output modules 18, 20 mounted adjacent to each other. It is understood that the industrial controller 10 may include numerous different configurations. An industrial controller may include a rack or multiple racks in which modules are inserted. A backplane extends along the rack for communication between modules and an industrial network may be configured for communication between remote racks or other devices within the controlled machine or process. According to the illustrated embodiment, each module is mounted on a rail 11, such as a DIN rail. A backplane is established via connectors on adjacent modules. Still other industrial controllers may include a fixed configuration, having a predefined processor, communication interface, inputs, and outputs. The illustrated industrial controller 10 is intended to be exemplary and not limiting.

The processor module 14 is configured to execute a control program or a series of different programs, in series, in parallel, or a combination thereof to achieve desired operation of the controlled machine or process 15. Motion in the controlled machine or process may be achieved by controlling operation of one or more motors 40 with a motor drive 30. Each motor drive 30 and the corresponding motor 40 to be controlled by the motor drive 30 are sometimes referred to as an axis of motion. The illustrated embodiment includes three axes of motion within the controlled machine or process 15. The controlled machine or process 15 may include any number of axes of motion according to the application requirements. The control program executing in the processor module 14 may be configured to generate motion commands to achieve the desired operation of the controlled machine or process 15. Optionally, one or more dedicated motion modules may be included in the industrial controller 10 to generate the motion commands. These motion commands are, in turn, transmitted to the motor controller 30.

According to the illustrated embodiment, a network cable 22 is connected between the communication module 16 and each motor controller 30 across which the motion command may be transmitted. Optionally, the network cable 22 may be connected directly to the processor module 14, or the network cable 22 may be connected to a motion module included in the industrial controller 10. Each motor controller 30 includes at least one network communication port 32. According to the illustrated embodiment, each motor controller 30 includes multiple communication ports. A first communication port 32 on a first motor controller 30 is connected to the communication module 16, and a second communication port 32 on the first motor controller 30 is connected to a first communication port 32 on a second motor controller 30. Still additional motor controllers 30 could be connected in a similar manner from the second communication port 32 of the second motor controller 30, such that multiple motor controllers 30 may be connected in a daisy-chain configuration. A third communication port 34 on each motor controller 30 is connected to an analytic module 70, as will be discussed in more detail below.

Each motor controller 30 is operatively connected to a motor 40 and is configured to control operation of the connected motor. According to the illustrated embodiment, each motor controller 30 receives power from a power source 31. The power source 31 may be a multi-phase Alternating Current (AC) voltage, a single-phase AC voltage, or a Direct Current (DC) voltage according to the application requirements. The motor controller 30 converts the power received at the input to a desired voltage and/or current supplied at an output 33 to achieve desired operation of the motor 40.

According to one embodiment of the invention, a pair of cables 35, 37 may extend between the motor controller 30 and the motor 40. A first cable 35 is a single-pair Ethernet cable and is utilized for communication between the motor controller 30 and the motor 40. The first cable 35 is connected between one of the communication ports 34 on the motor controller 30 and the analytic module 70. The second cable 37 is utilized for supplying the voltage from the output 33 of the motor controller 30 to the motor 40.

According to another embodiment of the invention, a single cable (not shown) may extend between the motor controller 30 and the motor 40. The single cable may be configured to include conductors for both the single-pair Ethernet and the output voltage. The single-pair Ethernet enters the analytic module 70 and the conductors for the output voltage are split out at the analytic module and provided to the motor 40. The single pair Ethernet cable is configured to provide power for operation of the analytic module 70 via PoE on the single pair Ethernet cable.

Each motor 40 includes a stator and a rotor. In many applications, it is desirable for the motor controller 30 to have knowledge of an angular position of the rotor. A position feedback device 46, such as an encoder or resolver, may be mounted to one side of the rotor, where the position feedback device 46 is configured to generate a position feedback signal corresponding to the angular position of the rotor. The other end of the rotor includes a drive shaft 48, which may be connected to a drive assembly by which the controlled machine or process 15 operates. It is contemplated that the drive assembly may be a gearbox, a pulley, a drive chain, a ball screw, other drive members, or a combination thereof by which a desired motion in the controlled machine or process 15 is obtained as a result of rotation of the rotor within the motor 40. In certain applications, such as robotic motion, it may be desirable to provide a second encoder at the output of the drive assembly where the second encoder may be operatively connected to an output drive member from the drive assembly. The second encoder may be used to verify an angular position of an end effector or tool located at the output of the drive assembly and the second encoder provides a second position feedback signal.

It is further contemplated that the motor 40 may include still additional devices 80 mounted on or proximate to the motor, where the additional devices 80 generate signals corresponding to operation of the motor 40, the drive assembly, or of other aspects of the controlled machine or process. It is contemplated that the additional devices 80 may be sensors configured to measure, for example, temperature, angular acceleration, vibration, orientation, proximity, a level, an open or closed contact, and the like. One of the additional devices 80 may be, for example, a temperature sensor mounted in the body of the motor or outside the motor, where the temperature sensor is configured to generate a temperature feedback signal for the motor or of an ambient temperature, respectively. Each of the feedback signals proximate a motor 40, including the position feedback signal, the second position feedback signal, if present, the temperature feedback signal, or any other feedback signals generated by other devices 80 mounted on or proximate to the motor 40 are provided to the analytic module 70 for subsequent transmission back to the motor controller 30.

Turning next to FIG. 3A-FIG. 5, the analytic module 70 may take one of several different form factors. In FIG. 3A, the analytic module 70A is configured to mount directly to a motor drive 30. The analytic module 70A includes a plug 71 (see FIG. 3B) complementary to the communication port 34 on the motor drive. According to one embodiment of the invention, the plug 71 has an RJ45 form factor and is configured to establish a single-pair Ethernet connection between the motor drive 30 and the analytic module 70A. Optionally, the plug 71 may have a form factor other than an RJ45 form factor to distinguish the single-pair Ethernet connection from a standard Ethernet connection. The communication port 34, in which the plug 71 on the analytic module 70A is inserted, is similarly configured to conduct via a single-pair Ethernet connection. The analytic module 70A includes a pair of mounting holes 73 through which a screw or bolt may be inserted. Complementary openings 39 on the motor drive 30 align with the mounting holes 73 on the analytic module. A screw or bolt may be inserted through the mounting hole 73 and secured to the opening 39 on the motor drive 30 to hold the analytic module 70A to the motor drive 30. Optionally, captive screws or bolts may be provided with and retained by the analytic module 70A. Still other methods of fastening the analytic module 70A to the motor drive 30 may be utilized without deviating from the scope of the invention. The analytic module 70A includes at least one socket 75 configured to receive a plug from a remote device 80 mounted proximate the motor 40. According to still another option, the analytic module 70A may include terminals 77 to which a cable from the remote device 80 may be connected.

In FIG. 4, the analytic module 70B is configured to mount to a DIN rail 11. The analytic module 70B includes a communication port 79 complementary to the communication port 34 on the motor drive 30. According to one embodiment of the invention, the communication port has an RJ45 form factor and is configured to receive one end of a single-pair Ethernet cable connected between the motor drive 30 and the analytic module 70B. The communication port 34 on the motor drive 30 is configured to receive the other end of the single-pair Ethernet cable. Optionally, one or more network devices, such as a switch, router, gateway, or the like may be connected between the motor drive 30 and the analytic module. The analytic module 70B includes a mounting slot 81 on the rear of the module configured to engage the DIN rail 11. Optionally, the analytic module 70B may include mounting holes 73 similar to the embodiment illustrated in FIGS. 3A, 3B. The analytic module 70B may then be mounted to a control panel at any location in the controlled machine or process 15. The analytic module 70B includes at least one socket 75 configured to receive a plug from a remote device 80 mounted proximate the motor 40. According to still another option, the analytic module 70B may include terminals 77 to which a cable from the remote device 80 may be connected.

Figure 5:
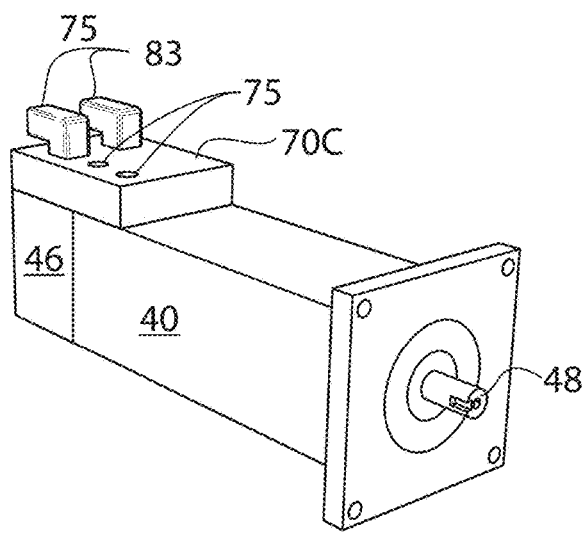
FIG. 5 is a perspective view of a third embodiment of the invention configured to mount to a motor.

In FIG. 5, the analytic module 70C is configured to be mounted directly to the motor 40. The analytic module 70C includes one or more connectors 83 configured for an industrial application. It is contemplated that the connector 83 may include a threaded exterior periphery. A complementary connector may plug in to the motor connector 83, and a retaining ring on the complementary connector can screw on to the threaded exterior periphery to secure a cable to the motor. Optionally, the connector may include a gasket to provide an air or water tight seal with the connector. Still other form factors may be implemented according to the application requirements. One end of a single-pair Ethernet cable may be configured with the complementary connector such that the single-pair Ethernet connection is established from the motor drive 30 to the analytic module 70C mounted on the motor 40. In certain applications, it may be acceptable to provide a communication port having an RJ45 form factor as shown on the second embodiment of the analytic module 70B. The communication port 34 on the motor drive 30 is configured to receive the other end of the single-pair Ethernet cable. Optionally, one or more network devices, such as a switch, router, gateway, or the like may be connected between the motor drive 30 and the analytic module. The analytic module 70C is mounted to the motor 40 according to any suitable mounting configuration. The analytic module 70C includes at least one socket 75 configured to receive a plug from a remote device 80 mounted proximate the motor 40. According to still another option, the analytic module 70C may include terminals in a manner similar to the embodiments of FIGS. 3 and 4 to which a cable from the remote device 80 may be connected. According to yet another option, when the analytic module 70C is mounted to the motor 40, the application is well suited to embed one or more sensors, such as a vibration sensor or a temperature sensor, within the analytic module. The feedback signals may be provided directly from the sensor to the processor 92 in the analytic module 70C.

Figure 2:
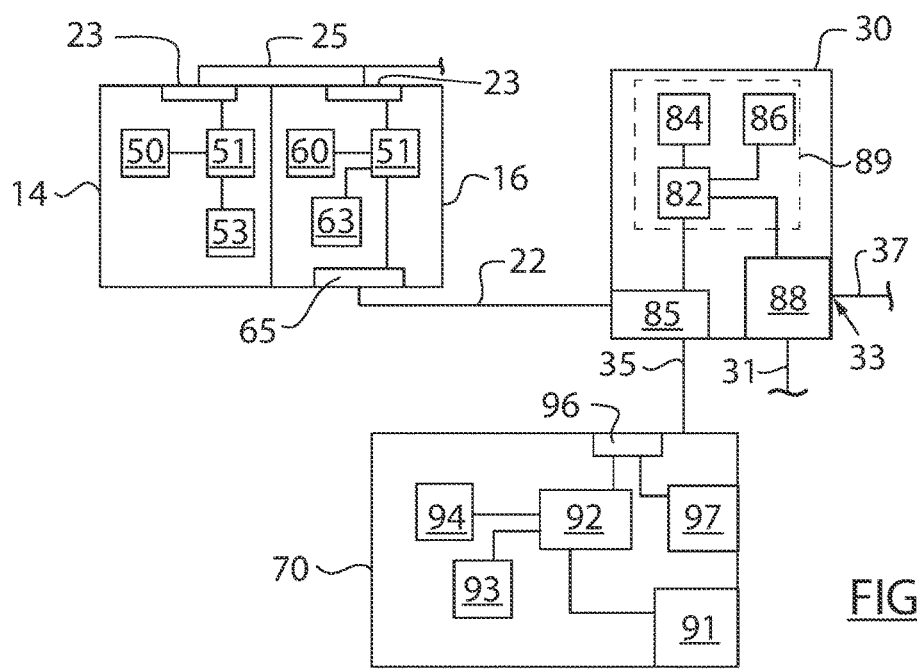
FIG. 2 is a partial block diagram representation of the exemplary motion application shown in FIG. 1.

Referring next to FIG. 2, the processor module 14 includes a processor 51 in communication with a memory device 50 to execute an operating system program, generally controlling the operation of the processor module 14, and a control program, describing a desired operation of the controlled machine or process 15, where each control program is typically unique to a given application of the industrial control system. The processor module 14 communicates with adjacent modules via the backplane 25 extending between backplane connectors 23. A clock circuit 53 is provided to generate a clock signal for the processor module 14. It is contemplated that the clock circuit 53 in the processor module 14 may be a master clock module to which each of the other clock circuits in the control system are synchronized.

The network module 16 similarly includes a processor 61 in communication with a memory device 60 to execute instructions for operation of the network module. The network module 16 communicates with adjacent modules via the backplane 25 extending between backplane connectors 23. The network module 16 includes a clock circuit 63 configured to generate a clock signal for the network module 16. The network module 16 further includes a communication interface 65 configured to be connected to the industrial network. The communication interface 65 may include multiple communication ports, where each communication port may be identical and configured to communicate via a single industrial network. Optionally, the communication interface 65 may include communication ports having different configurations for different industrial networks. Network cables 22 configured for the desired industrial network are configured to connect to each communication port 65. The communication port includes the physical elements of a communication stack to receive data from the network cables 22 and either pass data packets along the cables 22 to another device or to pass data packets up to the processor 61. The processor 61 may also generate data packets and transmit the data packets back down through the communication interface 65 to the network cables 22. The communication interface 65 provides for execution of low-level electrical protocols on the industrial control network. Similar communication interface circuits may be provided on other devices, such as the motor drives 30 or analytic modules 70, to provide communication between devices.

Each motor drive 30 includes a control circuit 89, which includes a microprocessor 82 and a program stored in memory 84 and/or dedicated control circuitry such as an application specific integrated circuit (ASIC) or field programmable gate array (FPGA). The control circuit 89 may include one or more dedicated processing devices, configured, for example, to control switching of power electric devices in a power segment 88 of the motor drive 30 to convert the voltage at the input 31 to a desired voltage at the output 33 of the motor drive 30. The motor drive 30 includes a clock circuit 86 configured to generate a clock signal for the motor drive 30. The motor drive 30 further includes a communication interface 85 configured to be connected to the industrial network. According to the illustrated embodiment, the communication interface 85 includes each of the communication ports 32, 34 and provides for execution of low-level electrical protocols via any desired industrial protocol such as EtherCAT®, Ethernet/IP®, or Profinet®, DeviceNet®, ControlNet®, or CompoNet®. The communication interface 85 is configured to communicate with the analytic module 70 via a single-pair Ethernet connection.

The analytic module 70 includes a processor 92 in communication with memory 94 and is configured to execute a series of instructions stored in the memory 94. The processor 92 may be a single processor, multiple processors, or multiple processing cores arranged on a single device. The processor 92 may be configured to execute a single series of instructions or multiple series of instructions asynchronously, synchronously, in series, or in tandem. The memory 94 may be a single device or multiple devices and includes at least a portion of non-volatile memory. The analytic module 70 also includes a communication interface 96 for managing communication with the motor controller 30. According to one embodiment of the invention, the communication interface 96 is an Ethernet interface. Similarly, the communication port 34 on the motor controller 30 is an Ethernet port. If the network between the industrial controller 10 and the motor controller 30 is similarly an Ethernet network, or an industrial Ethernet network, data packets may be transmitted between the analytic module 70 and the motor controller 30 or between the analytic module 70 and other devices, such as the industrial controller 10, connected to the network. The communication interface 96 may be an integral component of the processor 92 or, optionally, a separate communication interface 96 may be arranged on a common printed circuit (PC) substrate to which the interface 96 and processor 92 may be mounted. The communication interface 96 is configured to transmit and receive data packets over the network according to the protocol of the network, where the protocol is preferably an industrial network protocol.

According to one aspect of the invention, Ethernet connection between the analytic module 70 and the motor drive 30 is configured as a single-pair Ethernet connection with PoE. A power regulator 97 is provided in the analytic module and is configured to receive power from the communication interface 96. The power regulator 97 may include one or more power regulator devices configured to receive a DC voltage injected on the single-pair Ethernet connection. The DC voltage injected may be in the range of 5 to 57 VDC and, preferably is in a range of 7-12 VDC. The power regulator 97 converts the input voltage to a desired output voltage, such as 3.3 VDC, 5 VDC, 24 VDC, or any other DC voltage required to energize electronic devices within the analytic module 70. The DC voltages output from the power regulator(s) 97 are provided, for example, to the processor 92, memory 94, and other circuits within the analytic module 70 for operation.

The analytic module 70 further includes a clock circuit 93 and a sensor interface 91. The clock circuit 93 generates a clock signal for use in the analytic module 70. The sensor interface 91 is configured to receive each of the feedback signals provided to the communication module. The sensor interface 91 may include, for example, buffers to temporarily store values of the feedback signals or analog-to-digital converters to convert an analog feedback signal to a digital feedback signal. The sensor interface 91 includes circuitry and components to receive and process the feedback signals to a suitable form for the processor 92.

In operation, the analytic module 70 provides an interface between one or more sensors/devices mounted on or proximate to the motor 40 being controlled by the motor controller 30. Typically, a motor controller 30 has served as a final node in an industrial network. Position feedback data or data from other sensors/devices mounted on or proximate to the motor 40 are first transmitted to the motor controller 30 and then may be transmitted over the network. Similarly, if a sensor is, for example, a smart sensor with the ability to be remotely configured, the motor controller 30 must be configured to first receive the configuration packet and then a communication interface between the motor controller 30 and the sensor must be established to pass on the configuration data. Operating in such a capacity, however, places extra demands on the motor controller 30. The motor controller 30 must be configured with additional inputs and outputs configured to receive or send signals with the devices mounted on or proximate to the motor 40. Similarly, a portion of the processing bandwidth in the motor controller is required to serve as a gateway to receive the data feedback signals, package these signals into data packets, and transmit them to the industrial controller 10. Dedicated wiring between each device and the motor controller 30 is also required. As the number of devices located on or proximate to the motor 40 increases, the number of conductors required increases, increasing the physical space required for wiring, reducing the flexibility of bundled wires, and increasing the potential for a wiring error to occur.

Inclusion of the analytic module 70 in the controlled machine or process 15 reduces the processing demands placed on the motor controller 30 and simplifies wiring between the motor 40 and the motor controller 30. As illustrated in FIG. 1, the wiring includes just a pair of cables 35, 37, with a single-pair Ethernet cable 35 connected between the motor drive 30 and the analytic module 70 and a power cable 37 extending between the motor controller 30 and the motor 40. In some embodiments of the invention, the pair of cables 35, 37 may be combined into a single cable. The single cable includes a pair of conductors for the single-pair Ethernet, the power conductors to the motor and a ground conductor. The single cable extends between the motor controller 30 and the analytic module 70. For the on-motor embodiment, illustrated in FIG. 5, all wiring between the motor controller 30 and motor 40 may be done via the single cable. If the analytic module 70 is mounted off the motor 40 as shown, for example, in FIG. 4, the single cable extends between the motor controller 30 and the analytic module 70. The single-pair Ethernet conductors are electrically connected to the communication interface 96 in the analytic module 70 and the power and ground conductors are electrically connected to a separate cable extending between the analytic module 70 and the motor 40 to provide voltage from the power segment 88 to the motor 40.

Sensor cables 69 extend between a position feedback device 46 and other devices 80 located proximate the motor to the analytic module 70. The analytic module 70 receives the feedback signals and transmits them back to the motor drive 30, industrial controller 10, or other processing device. The feedback signals transmitted by these sensor cables 69 are received at the sensor interface 91. The feedback signals may be proprietary data packets, such as those generated by certain position feedback devices, or the feedbacks signals may be digital or analog signals corresponding to an operating state in the controlled machine or process 15. The sensor interface 91 converts the feedback signals to digital values suitable for use in a digital processor and passes the signals to the processor 92 in the analytic module. The processor 92 in the analytic module 70 then samples a value of the feedback signal for transmission. The processor 92 may periodically sample values of the feedback signal and insert these values into data packets for transmission via the single-pair Ethernet connection in real-time. Optionally, the processor 92 may periodically sample multiple values of the feedback signal and package multiple values for transmission in a single packet. According to still another aspect of the invention, the processor 92 may be configured to perform some initial processing on the feedback signal. The processor 92 may, for example, filter the sampled values or convert the sampled value, for example, from a position feedback signal to a velocity feedback signal. The processor 92 may then insert the processed data into data packets for transmission back to the motor controller 30 or industrial controller. The analytic module 70 transmits the generated data packets to the motor controller 30 if the feedback signal, such as angular position of the motor, is intended for the motor controller 30 or may transmit the data packet back to the industrial controller 10 if the feedback signal, is needed for the control program executing in the processor module 14 of the industrial controller.

According to one aspect of the invention, each of the devices in the system have clock circuits synchronized with each other. Synchronization may be performed using, for example, the Precision Time Protocol (PTP) as defined in the IEEE-1588 standard. One clock circuit is defined as a master clock circuit or, preferably, as a grandmaster clock circuit and synchronized to an external time reference, such as a Global Positioning System (GPS). Once the master, or grandmaster, clock circuit has been synchronized, clock circuits in adjacent devices in the industrial network are synchronized to the master, or grandmaster clock circuit. An adjacent device in the industrial network does not refer to physical positioning, but rather is a device that is one communication hop away from another device along the industrial network. Successive devices along the industrial network are synchronized until all of the clock circuits have been synchronized. With reference, for example to FIG. 2, the clock circuit 53 in the processor module 14 serves as the master, or grandmaster, clock circuit. The clock circuit 63 in the communication module 16 is synchronized to the clock circuit 53 in the processor module. The clock circuit 86 in the motor drive 30 is synchronized to the clock circuit 63 in the communication module, and the clock circuit 93 in the analytic module 70 is synchronized to the clock circuit 86 in the motor drive 30 such that all clock circuits are executing synchronously.

In a motion application, precise control of the motor 40 requires that the motor controller 30 receives the angular position of the motor 40. In addition to receiving the angular position, the motor controller 30 must obtain the sampled value at precise intervals and, preferably, at a consistent time during the interval (i.e., without jitter). A control algorithm executing within the motor controller 30 similarly executes at the same interval as the angular position is sampled or at multiples of the interval. In a traditional control system, the position feedback signal is provided directly from the position feedback device 46 to the motor controller 30. The motor controller 30 may, therefore, sample the position feedback signal at any time according to the requirements of the control algorithm executing in the motor controller 30. However, because the position feedback signal is being transmitted to the motor controller 30 via the analytic module 70, the motor controller 30 must coordinate with the analytic module 70 to obtain the angular position at a desired time interval.

Figure 6A:
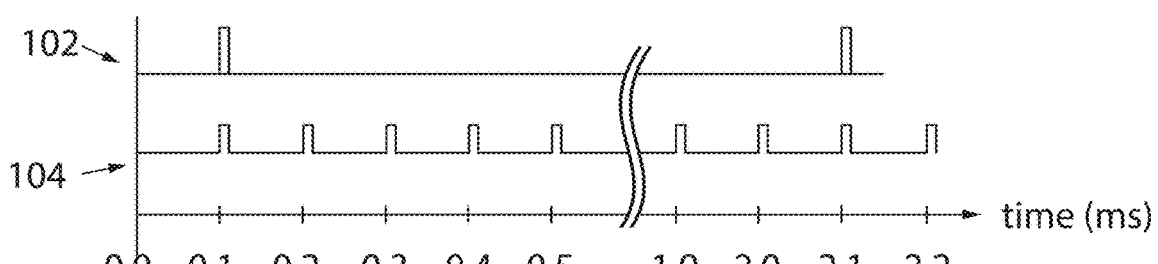
FIG. 6A is a timing chart illustrating exemplary update intervals in a motor controller shown in FIG. 1.
Figure 6B:
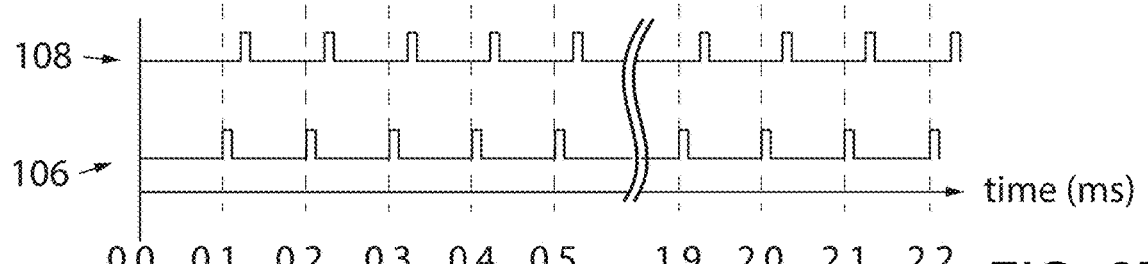
FIG. 6B is a timing chart illustrating an exemplary sample and transmit sequence in one update period of an analytic module shown in FIG. 1.

With reference to FIGS. 6A and 6B, exemplary timing diagrams illustrate coordination of update periods between the motor controller 30 and the analytic module 70. FIG. 6A illustrates two different periodic update intervals executing in the motor controller 30. A first update interval 102 is slower and executes at a two millisecond interval. A second update interval 104 is faster and executes at a one hundred microsecond interval. The first update interval 102 may be configured to execute slower control loops, such as a position control loop or a velocity control loop. The second update interval 104 may be configured to execute a faster control loop, such as a current regulator. Still additional periodic update intervals as well as background execution of instructions may exist within the motor controller 30 according to the application requirements. FIG. 6B illustrates one periodic update interval executing within the analytic module 70. The first periodic signal 106 corresponds to the start of every periodic update interval. The second periodic signal 108 corresponds to a time within the periodic update interval at which data is transmitted from the analytic module 70 to the motor controller 30.

According to one aspect of the invention, the motor controller 30 may provide the analytic module 70 an indication of the start of an update period at which it wishes the feedback signal to be sampled. The motor controller 30 transmits a start time and duration of the second update interval 104 in which the motor controller 30 requires position feedback data. The analytic module 70 may set its periodic update interval, corresponding to the first periodic signal 106, equal in duration to the duration of the second update interval 104 for the motor controller 30. Because the clock circuit 93 in the analytic module 70 is synchronized in time with the clock circuit 86 in the motor controller 30, the analytic module 70 may also set the start point 106 of its periodic interval to coincide with the start point of the second periodic interval 104 in the motor controller 30. Thus, the second periodic update interval 104 within the motor controller 30 may execute synchronously with the periodic update interval in the analytic module 70. The analytic module samples the position feedback signal at the start of each update interval as indicated by the first periodic signal 106. The analytic module packages the value of the feedback signal into a data packet and transmits the value of the feedback signal to the motor controller 30 at the time indicated by the second periodic signal 108. Thus, the analytic module 70 may coordinate with the motor controller 30 for real-time control of the motor 40.

According to another aspect of the invention, the analytic module 70 may store a timestamp corresponding to the time at which it samples the position feedback signal. The timestamp may be inserted into the data packet with the value of the position feedback signal. The motor controller 30 receives the timestamp and the position feedback signal. The motor controller 30 may use data from two sequential data packets to interpolate a value of the position feedback signal between two timestamps as a function of the values of the position feedback signals obtained at each timestamp.

According to another aspect of the invention, it is contemplated that other data in addition to the position feedback signal may need to be sent from the analytic module 70 to the motor controller 30 within each of the second periodic update cycles 104 of the motor controller 30. In one application, a second position feedback device may be mounted to provide a check on the first position feedback device 46 or to verify operation of the mechanical drive train. The position feedback signal from the second position feedback device may similarly be sampled at the start of each cycle and both angular position values may be packaged into a data packet and transmitted to the motor controller 30. In another application, it may be desirable for the motor controller 30 to have data from one or more of the sensors 80 mounted proximate to the motor at the same frequency as the angular position of the motor. A vibration sensor, for example, may be mounted to the motor and generate a feedback signal corresponding to vibration measured on the motor 40. The value of the vibration feedback signal may be packaged within the position feedback signal in a data packet and transmitted to the motor controller 30 in tandem with the angular position. It is contemplated that the data to be sent in each data packet is configurable within the motor controller 30, and the motor controller 30 can send an initial configuration packet, for example, during power up or during a commissioning process to configure the analytic module 70 to transmit the desired data accordingly at the periodic frequency during the second periodic update interval 104.

According to still another aspect of the invention, it is contemplated that data transfer may be bidirectional between the motor controller 30 and the analytic module 70. The motor controller 30 may transmit data at the first periodic interval 102, the second periodic interval 104, or at any other suitable interval according to the application requirements. The motor controller 30 may also generate data packets "on-demand" responsive, for example, to control signals received from the industrial controller 10. As an exemplary application, the motor controller 30 may control operation of a brake on the motor 40 via serial communication. When the motor controller 30 receives a run command, the motor controller 30, in turn, generates a data packet with a brake release signal. The analytic module 70 receives the data packet with the brake release signal and sets an output signal to the brake, causing the brake to open. A sensor may be provided as one of the remote devices 80, where the sensor generates a feedback signal indicating whether the brake is open or closed. The analytic module 70, in turn, inserts the feedback signal into a data packet for transmission back to the motor controller.

As discussed above, the analytic module 70 is configured to receive feedback signals not only from the position feedback device 46 but also from other devices 80 mounted on or proximate to the motor 40. The motor controller 30 and/or the industrial controller 10 periodically requires values of the feedback signals. However, the timing for obtaining values of the other feedback signals is typically not as critical and/or does not require as frequent updates as a position feedback signal. The motor controller 30, for example, may execute a routine which generates pulse-width modulation (PWM) signals to control operation of the motor 40 at a frequency in the range of two to twenty kilohertz (2-20 kHz) and some applications may require a PWM frequency even greater than twenty kilohertz. The exemplary application discussed herein may execute a PWM routine at ten kilohertz (10 kHz) or within the one hundred microsecond update period 104. In contrast, the industrial controller 10 or the motor controller 30 may only require knowledge of other sensor feedback signals, such as the brake feedback signal or a motor temperature value, during each two millisecond interval 102 or at slower intervals such as five or ten milliseconds (5-10 msec). The analytic module 70 may then be configured to generate first data packets, including the position feedback signal at a first periodic interval 106, which is synchronized to the corresponding update interval in the motor controller 30 and to generate second data packets, including the other feedback signals such as the brake feedback signal, at a second periodic interval, where the second periodic interval is longer than the first periodic interval. These feedback signals may also be requested on-demand by the industrial controller 10 or motor controller 30. It is further contemplated that the on-demand messages may be used for configuration messages on power-up, parameter configuration, and other messages that may be sent infrequently or only when needed.

Figure 7:
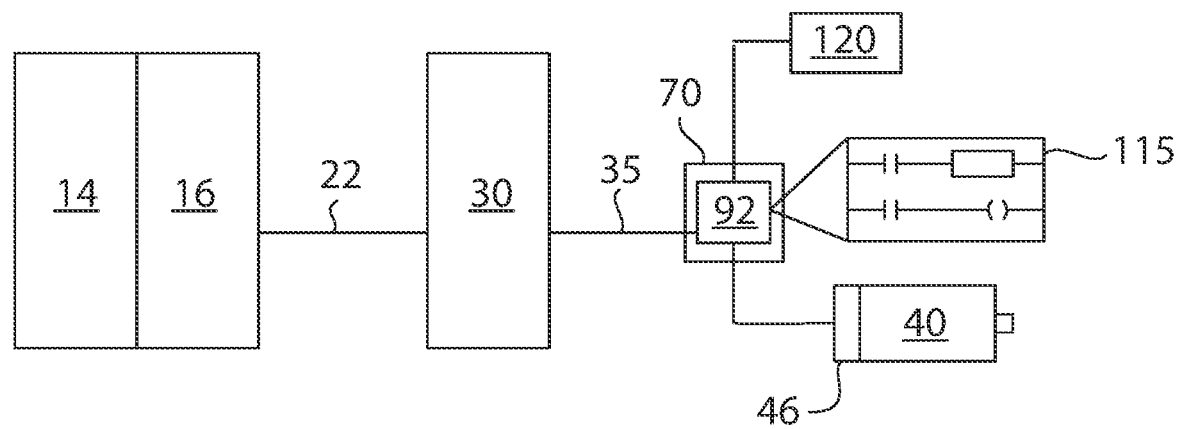
FIG. 7 is a partial block diagram representation of another exemplary motion application incorporating one embodiment of the present invention.

Turning next to FIG. 7, in some embodiments of the invention, the analytic module 70 is configured to execute at least one control instruction in response to data received at the module. As previously discussed with respect to a brake control signal, the data may be transmitted from the motor controller 30 to the analytic module 70. Optionally a feedback signal from one of the remote devices 80 may provide data used by the control instruction. FIG. 7 illustrates a segment of a ladder program 115 with two rungs illustrated. The first rung may include a compare instruction, a timer instruction, or the like, with at least one status bit. When the data received at the analytic module 70 indicates it is appropriate, a contact, serving as a first control instruction in the first rung, is closed and the instruction is executed. A status bit, set by the second instruction in the first rung, is used to set the contact, serving as a first control instruction in the second rung, which, in turns, sets an output. Optionally, the data may be used directly, such as the brake control signal to set the output. The output is set to an actuator 120 to achieve a desired function within the controlled machine or process 15. According to one example, the actuator 120 may be a glue gun, configured to output a drop of glue on a product moving along a process line. Each product may pass the glue gun at exactly one revolution of the motor 40. Thus, the position feedback signal is provided to a compare instruction and when the position feedback signal is equal to the desired angular position during each revolution, the output is set, causing the glue gun to output a drop of glue once per revolution of the motor 40.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:
1. A system for communication between a motor drive and at least one electronic device, wherein the motor drive is operative to control a motor in an industrial control system, the system comprising:
   a first Ethernet communication interface in the motor drive, the first Ethernet communication interface configured to receive a first end of a single-pair Ethernet cable;
   a first clock circuit in the motor drive, wherein a first update period in the motor drive executes as a function of the first clock circuit; and
   an analytic module further comprising:
      a second Ethernet communication interface, the second Ethernet communication interface configured to receive a second end of the single-pair Ethernet cable, wherein power is provided to the analytic module from the motor drive via the single-pair Ethernet cable,
      a second clock circuit in the analytic module, wherein the motor drive is configured to transmit a synchronization command to synchronize the second clock circuit to the first clock circuit and the analytic module sets a second update period equal in duration to the first update period in the motor drive;
      at least one input interface configured to receive a feedback signal from the at least one electronic device, wherein:
         the feedback signal corresponds to an operating state in the industrial control system,
         the feedback signal received from the at least one electronic device is sampled by the analytic module at a common time during each second update period,
         the at least one input interface converts the feedback signal to a digital value, and
      a processor configured to:
         receive the digital value of the feedback signal from the at least one input interface,
         insert the digital value of the feedback signal in a data packet, and
         transmit the data packet to the motor drive via the single-pair Ethernet cable in real-time.
2. The system of claim 1 wherein the processor is further configured to:
   obtain a timestamp from the second clock circuit corresponding to receiving the feedback signal, and insert the timestamp in the data packet with the digital value of the feedback signal.

3. The system of claim 1 wherein the processor is further configured to:
execute at least one control instruction responsive to the feedback signal, and
generate at least one output signal from the at least one control instruction as a function of the feedback signal.

4. The system of claim 1 wherein the data packet is configured to be received by another device other than the motor drive and the motor drive is configured to receive the data packet with a network interface and retransmit the data packet to the other device from the network interface.

5. The system of claim 1, wherein the at least one electronic device is a position feedback device configured to generate a position feedback signal corresponding to an angular position of the motor.

6. The system of claim 5, wherein:
the at least one electronic device includes a first electronic device and a second electronic device,
the first electronic device is the position feedback device,
the second electronic device is another feedback device, configured to generate another feedback signal corresponding to an operating state of the industrial control system.

7. The system of claim 6, wherein the processor is further configured to:
insert the digital value of the position feedback signal in a first data packet at a first periodic interval,
transmit the first data packet at the first periodic interval,
insert the digital value of the other feedback signal in a second data packet at a second periodic interval,
transmit the second data packet at the second periodic interval, and
the first periodic interval is shorter than the second periodic interval.

8. The system of claim 1, wherein:
the motor drive includes either an Ethernet plug or an Ethernet socket,
the analytic module includes either an Ethernet plug or an Ethernet socket, the analytic module being complementary to the motor drive, and
the analytic module is configured to mount to the motor drive such that the Ethernet plug or Ethernet socket on the motor drive engages the complementary Ethernet plug or Ethernet socket on the analytic module.

9. The system of claim 1, wherein the analytic module includes a slot configured to engage a DIN rail for mounting.

10. The system of claim 1, wherein the analytic module is configured to mount to the motor.

11. The system of claim 1, wherein:
the motor drive is further configured to transmit a start time and a duration of the first update period in the motor drive to the analytic module via the first Ethernet communication interface, and
the analytic module is further configured to set the second update period equal to the first update period in the motor drive as a function of the start time and the duration.

12. A method for communication between a motor drive and at least one electronic device, wherein the motor drive is operative to control a motor in an industrial control system, the method comprising the steps of:
transmitting a synchronization command from the motor drive to an analytic module;
synchronizing a second clock circuit in the analytic module to a first clock circuit in the motor drive responsive to receiving the synchronization command at the analytic module;
defining a second periodic update interval within the analytic module, wherein the second periodic update interval is equal in duration to a first periodic update interval in the motor drive;
receiving a feedback signal from the at least one electronic device at an input interface for the analytic module, wherein:
the analytic module is connected to the motor drive via a single-pair Ethernet cable,
the analytic module is configured to receive power from the motor drive via the single-pair Ethernet cable, and
the feedback signal corresponds to an operating state in the industrial control system;
sampling the feedback signal with the analytic module at a common time during the second periodic update interval;
converting the sampled feedback signal to a digital value with the input interface;
inserting the digital value of the feedback signal in a data packet with a processor for the analytic module; and
transmitting the data packet to the motor drive via the single-pair Ethernet cable in real-time.

13. The method of claim 12 further comprising the steps of:
transmitting a start time for the first periodic update interval to the analytic module; and
sampling the feedback signal in the analytic module synchronous with the start time for the first periodic update interval, wherein the digital value of the feedback signal is obtained by the sampling and transmitted to the motor drive during the corresponding second periodic update interval in which the digital value is sampled.

14. The method of claim 12 further comprising the steps of
obtaining a timestamp from the second clock circuit corresponding to receiving the feedback signal, and
inserting the timestamp in the data packet with the digital value of the feedback signal.

15. The method of claim 12 further comprising the steps of:
executing at least one control instruction with the processor in the analytic module responsive to the feedback signal, and
generating at least one output signal with the processor responsive to executing the at least one control instruction and as a function of the feedback signal.

16. The method of claim 12 wherein the data packet is configured to be received by a device other than the motor drive, the method further comprising the steps of:
receiving the data packet at a network interface in the motor drive; and
retransmitting the data packet to the device other than the motor drive with the network interface.

17. The method of claim 12 wherein the at least one electronic device is a position feedback device configured to generate a position feedback signal corresponding to an angular position of the motor and wherein the motor drive is configured to control operation of the motor as a function of the position feedback signal received via the analytic module.

18. The method of claim 17, wherein:
the at least one electronic device includes a first electronic device and a second electronic device,
the first electronic device is the position feedback device,
the second electronic device is another feedback device, configured to generate another feedback signal corresponding to an operating state of the industrial control system, the method further comprising the steps of:
inserting the digital value of the position feedback signal in a first data packet at the second periodic update interval,
transmitting the first data packet at the second periodic update interval,
inserting the digital value of the other feedback signal in a second data packet at a third periodic update interval, and
transmitting the second data packet at the third periodic update interval, wherein the first second periodic update interval is shorter than the third periodic update interval.

* * * * *